US008665267B2

(12) United States Patent
Joshi et al.

(10) Patent No.: US 8,665,267 B2
(45) Date of Patent: Mar. 4, 2014

(54) SYSTEM AND METHOD FOR GENERATING 3D SURFACE PATCHES FROM UNCONSTRAINED 3D CURVES

(75) Inventors: Pushkar P. Joshi, Fremont, CA (US); Fatemeh Abbasinejad, Davis, CA (US)

(73) Assignee: Adobe Systems Incorporated, San Jose, CA (US)

( * ) Notice: Subject to any disclaimer, the term of this patent is extended or adjusted under 35 U.S.C. 154(b) by 619 days.

(21) Appl. No.: 12/957,005

(22) Filed: Nov. 30, 2010

(65) Prior Publication Data
US 2013/0127848 A1    May 23, 2013

Related U.S. Application Data

(60) Provisional application No. 61/386,330, filed on Sep. 24, 2010.

(51) Int. Cl.
*G06T 17/20* (2006.01)
(52) U.S. Cl.
USPC .......................................................... 345/420
(58) Field of Classification Search
None
See application file for complete search history.

(56) References Cited

U.S. PATENT DOCUMENTS 5,459,821 A * 10/1995 Kuriyama et al. ............ 345/420
6,731,280 B1 * 5/2004 Koelman ...................... 345/420

OTHER PUBLICATIONS

Bae, S.-H., Balakrishnan, R., & Singh, K. ILoveSketch: As-natural-as-possible sketching system for creating 3D curve models. ACM Symposium on User Interface Software and Technology. 2008, 10 pages.

Cohen-Steiner, D., Alliez, P., & Desbrun, M. (2004). Variational Shape Approximation. ACM Siggraph, 10 pages.
Wesche, G., & Seidel, H.-P. (2001). FreeDrawer: a free-form sketching system on the responsive workbench. ACM Virtual Reality and Software Technology.
Hoppe, H. (1996). Progressive Meshes. ACM Siggraph, 10 pages.
Inoue, K., Shimada, K., & Chilaka, K. (2003). Solid Model Reconstruction of Wireframe CAD Models Based on Topological Embeddings of Planar Graphs. Journal of Mechanical Design, 27 pages.
Kara, L., & Shimada, K. (2007). Sketch-based 3D-shape creation for industrial styling design. IEEE Computer Graphics and Applications, 12 pages.
Paton, K. (1969). An Algorithm for Finding a Fundamental Set of Cycles of a Graph. Communication of the ACM, 5 pages.
Rose, K., Sheffer, A., Wither, J., Cani, M.-P., & Thibert, B. (2007). Developable Surfaces from Arbitrary Sketched Boundaries. Eurographics/ACM SIGGRAPH Symposium on Geometry Processing (SGP), 1 page.
Sachs, E., Roberts, A., & Stoops, D. (1991). 3-Draw: a tool for designing 3D shapes. IEEE Computer Graphics and Applications, 9 pages.
Turk, G., & O'Brien, J. (2002). Modelling with implicit surfaces that interpolate. ACM Transactions on Graphics, 12 pages.

* cited by examiner

*Primary Examiner* — Edward Martello
(74) *Attorney, Agent, or Firm* — Wolfe-SBMC

(57) ABSTRACT

Various embodiments of a system and methods for generating 3D surface patches from unconstrained 3D curves are described. The system may receive a set of unconstrained 3D wireframe curves that represent a 3D wireframe model. The 3D wireframe curves may be unorganized, may have inconsistent orientations, and may have an arbitrary number and type of curve intersections. The system may automatically generate the 3D surface patches, dependent on the 3D wireframe curves. The 3D surface patches may form a 3D surface that connects the 3D wireframe curves. The 3D surface patches may be generated from faces of the 3D wireframe model. The faces may be elementary cycles extracted from the 3D wireframe model. The system may receive user input which indicates changes to the 3D surface patches. A user may change, create, and/or delete 3D surface patches to achieve a desired 3D surface that represents the 3D wireframe model.

20 Claims, 9 Drawing Sheets

SYSTEM AND METHOD FOR GENERATING 3D SURFACE PATCHES FROM UNCONSTRAINED 3D CURVES

PRIORITY INFORMATION

This application claims benefit of priority of U.S. Provisional Application Ser. No. 61/386,330 entitled "System and Method for Generating 3D Surface Patches from Unconstrained 3D Curves" filed Sep. 24, 2010, the content of which is incorporated by reference herein in its entirety.

BACKGROUND

Description of the Related Art

Three-dimensional (3D) modeling of physical objects has many applications in the area of computer graphics. For example, computer-based 3D models of objects may be employed to generate animation, to insert digital images into film or photographic images, to design objects, and for many other purposes. As computing power has increased and 3D modeling algorithms have become more sophisticated, it has become possible to model objects of increasing complexity. For example, an object model may include data representative of hundreds or thousands, or more, individual surfaces of a modeled object.

3D wireframe models are often used to model 3D objects. A 3D wireframe model includes a set of 3D wireframe curves which define the shape of the 3D wireframe model. A boundary representation of a surface which represents the 3D wireframe model can be extracted from the 3D wireframe curves. The process of generating a surface for a 3D wireframe model is commonly referred to as "surfacing," "lofting," or "skinning" Surfacing wireframes for 3D wireframe models is important because a surface representation of a 3D wireframe model has several benefits over the original 3D wireframe representation. For example, some of these benefits are improved visualization of the shape of the object represented by the 3D wireframe model, the ability to disambiguate ambiguous wireframe loops, the ability to express more complex shapes (which may be hidden due to the occlusion of wireframe curves), and the ability to create a water-tight 3D surface model of the object. A water-tight 3D surface model of an object may be physically realizable or suitable for finite-element simulation. Conventional systems place strict constraints on 3D wireframe curves that are used to generate the 3D surface representation. For example, conventional systems require that the 3D wireframe curves are embeddable on a sphere, the wireframe model is a 2-manifold surface, and/or assume that the 3D wireframe curves enclose a closed volume. The strict constraints of conventional systems are inconvenient for a 3D wireframe model designer and are disruptive to the 3D wireframe model design process.

SUMMARY

Various embodiments of a system and methods for generating 3D surface patches from unconstrained 3D wireframe curves are described. The system may generate 3D surface patches from a set of 3D wireframe curves that form a 3D wireframe model. The method for generating 3D surface patches may include receiving a set of unconstrained 3D wireframe curves. The set of unconstrained 3D wireframe curves may represent a 3D wireframe model. The method may include automatically generating, dependent on the set of unconstrained 3D curves, a set of 3D surface patches. The 3D surface patches may form a 3D surface which connects the set of unconstrained 3D wireframe curves. The 3D surface formed by the automatically generated 3D surface patches may represent a 3D shape of the 3D wireframe model. Generating the plurality of 3D surface patches may include generating an undirected graph representing a connectivity for the plurality of unconstrained 3D wireframe curves and representing a plurality of intersection points for the plurality of unconstrained 3D wireframe curves.

The method for generating 3D surface patches may include, subsequent to automatically generating the 3D surface patches, receiving user input which may indicate one or more changes to the 3D surface patches. For example, a user may wish to change one or more of the 3D surface patches in order to change the shape of the 3D surface formed by the 3D surface patches. The method may further include updating the 3D surface patches. The 3D surface patches may be updated according to the one or more changes indicated by the user for the 3D surface patches.

Figure 1:
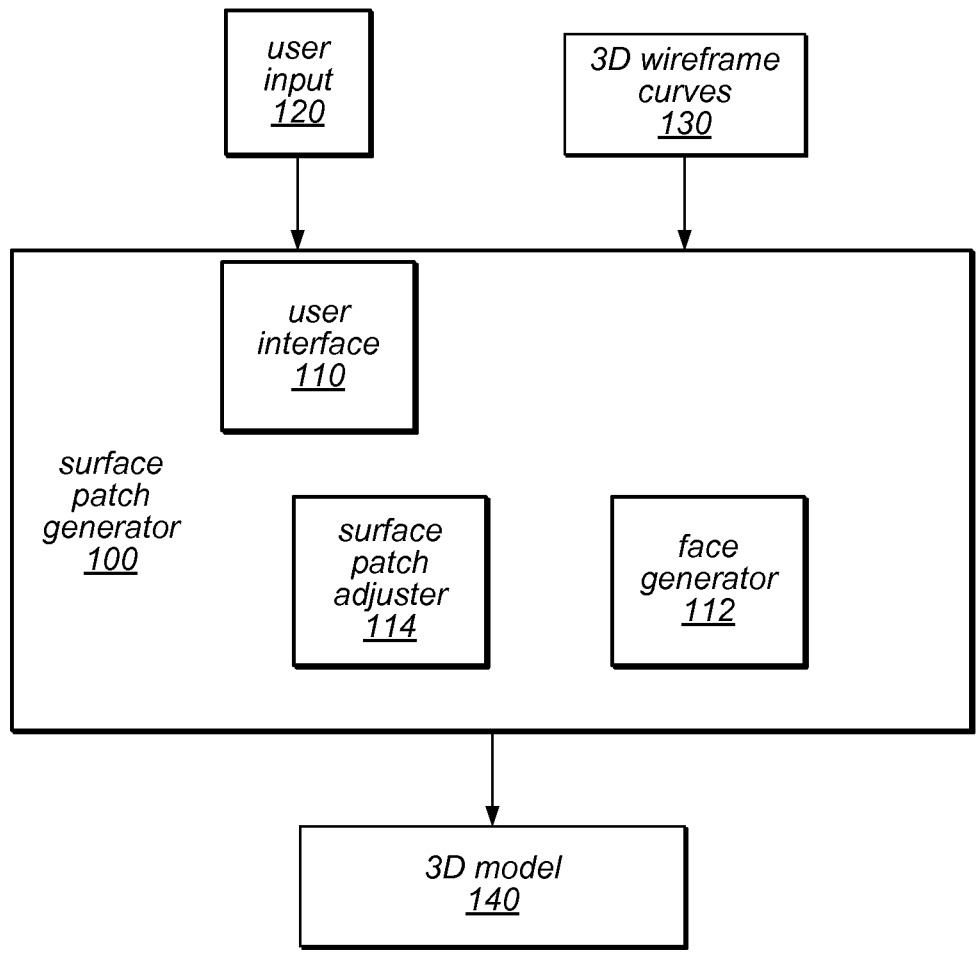
FIG. 1 illustrates an example of a surface patch generator which may be used to generate 3D surface patches from unconstrained 3D wireframe curves, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

In the following description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a system and methods for generating 3D surface patches from unconstrained 3D wireframe curves are described. For simplicity, the system may be referred to herein as a surface patch generator. In embodiments, a boundary representation of a 3D surface which represents a 3D wireframe model may be extracted from the 3D wireframe curves which define the 3D wireframe model. The surface patch generator may be implemented as a stand-alone application or as a module of or plug-in for an image processing and/or presentation application. Examples of types of applications in which embodiments of the surface patch generator may be implemented may include, but are not limited to, video editing, processing, and/or presentation applications, as well as applications in security or defense, educational, scientific, medical, publishing, digital photography, digital films, games, animation, marketing, and/or other applications in which digital image editing or presentation may be performed, e.g., where 3D aspects of scenes or image objects are relevant. Specific examples of applications in which embodiments may be implemented include, but are not limited to, Adobe® Photoshop® and Adobe® Illustrator®.

Figure 2A:
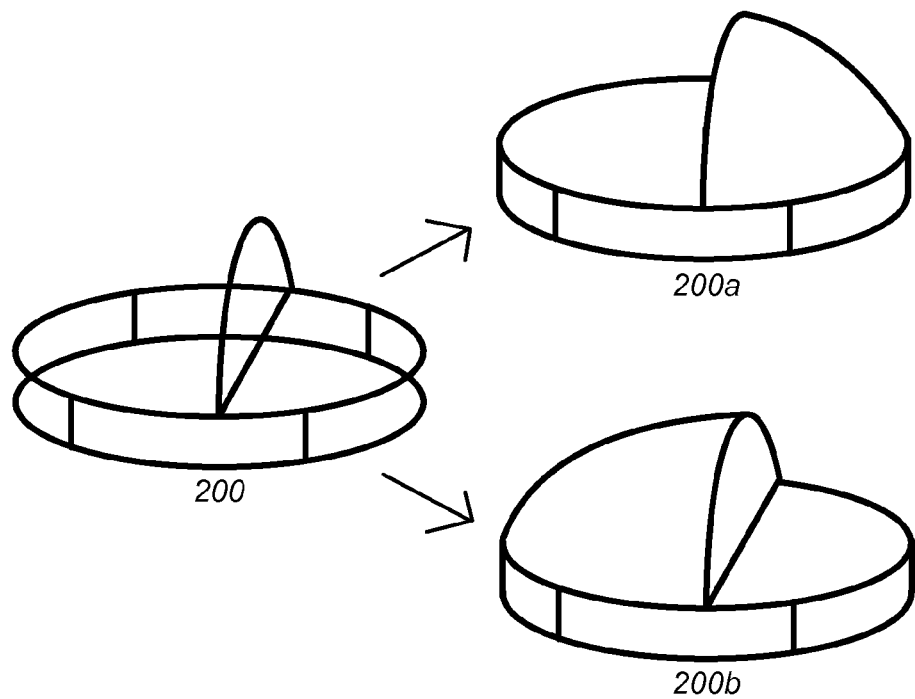
FIGS. 2A and 2B illustrate examples of multiple different valid 3D surfaces that may be interpreted from a single 3D wireframe model, according to some embodiments.
Figure 2B:
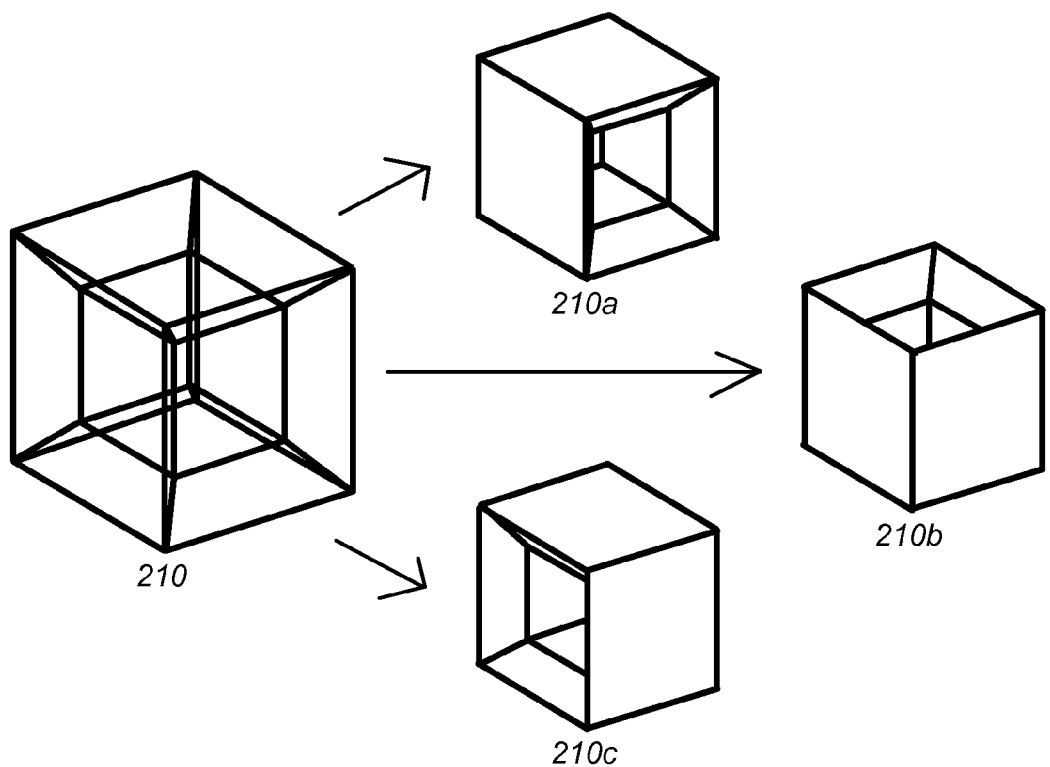

FIG. 1 illustrates an example of a surface patch generator which may be used to generate 3D surface patches from unconstrained 3D wireframe curves. Surface patch generator 100 may receive as input a set of 3D wireframe curves, such as 3D wireframe curves 130 illustrated in FIG. 1. 3D wireframe curves 130 may represent a 3D wireframe model. The 3D wireframe model may be generated, for example, in a 3D sketch modeling system, or a wireframe modeling system. 3D wireframe curves 130 may be unconstrained. For example, 3D wireframe curves 130 may be an unorganized, hierarchically-flat, set of 3D wireframe curves. The set of 3D wireframe curves 130 may be organized in an arbitrary order and may include at least two 3D wireframe curves with inconsistent orientations. 3D wireframe curves 130 may also include an arbitrary number and type of curve intersections between 3D wireframe curves. 3D wireframe curves 130 may not represent a 2-manifold surface. Each curve in the set of 3D wireframe curves 130 may be regular. More specifically, each curve may be smooth, with a well-defined tangent at all points along the curve. Each curve in the set of 3D wireframe curves may intersect with other curves in the set of 3D wireframe curves at a finite number of intersection points. FIGS. 2A and 2B, at 200 and 2100, respectively, illustrate examples of 3D wireframe models that are defined by 3D wireframe curves.

Surface patch generator 100 may be configured to automatically generate, dependent on 3D wireframe curves 130, 3D surface patches which may represent the 3D surface of the 3D wireframe model. The 3D surface may pass through all of the 3D wireframe curves. The shape of the 3D surface may be controlled by manipulating the shape of the 3D wireframe curves. The 3D surface patches may represent the 3D surface intended by the designer of the wireframe model. To generate the 3D surface, face generator 112 may be configured to automatically extract, dependent on the 3D wireframe curves, faces from the 3D wireframe model. As described in further detail below, a face of a 3D wireframe model may be an ordered sequence of connected curve intersection points (from the 3D wireframe curves) that form a closed boundary, or loop. The face may represent a region of the 3D surface of the 3D wireframe model that is within the closed boundary. To maintain local control and computational efficiency, surface patch generator 100 may calculate a set of 3D surface patches, rather than calculate a single, global solution, such as the entire surface of the 3D model at one time, as may be done in conventional methods.

A single 3D wireframe model may be represented by multiple valid 3D surface solutions. FIGS. 2A and 2B both illustrate examples of multiple different valid 3D surfaces that may be interpreted from a single 3D wireframe model. For example, FIG. 2A illustrates two different surfaces, 200a and 200b, that may be interpreted from 3D wireframe model 200. As another example, FIG. 2B illustrates three different valid 3D surfaces, 210a, 210b and 210c, that may be interpreted from 3D wireframe model 210.

The multiple potential value 3D surface solutions for a wireframe model may make it difficult for surface patch generator 100 to automatically generate the 3D surface that exactly matches the wireframe designer's intended design. Accordingly, surface patch generator 100 may automatically generate an initial set of 3D surface patches for the 3D surface based on an educated guess regarding the wireframe model designer's intent. The educated guess may be dependent on the 3D wireframe curves that define the 3D wireframe model.

Surface patch adjuster 114 may then allow a user to manually adjust the automatically generated 3D surface patches to create a set of 3D surface patches that match the intended 3D surface design for the 3D wireframe model. Surface patch adjuster 114 may receive user input 120 via user interface 110. User interface 110 may provide a mechanism by which a user may indicate changes to the automatically generated set of 3D surface patches. For example, user interface 110 may provide one or more textual and/or graphical user interface elements, modes or techniques via which a user may interact with surface patch generator 100, for example to change, create, and/or delete 3D surface patches. For example, using a patch merge mechanism, a user may merge two or more 3D surface patches into a single surface patch. From the set of manually adjusted 3D surface patches, surface patch generator 100 may generate 3D model 140.

Figure 3:
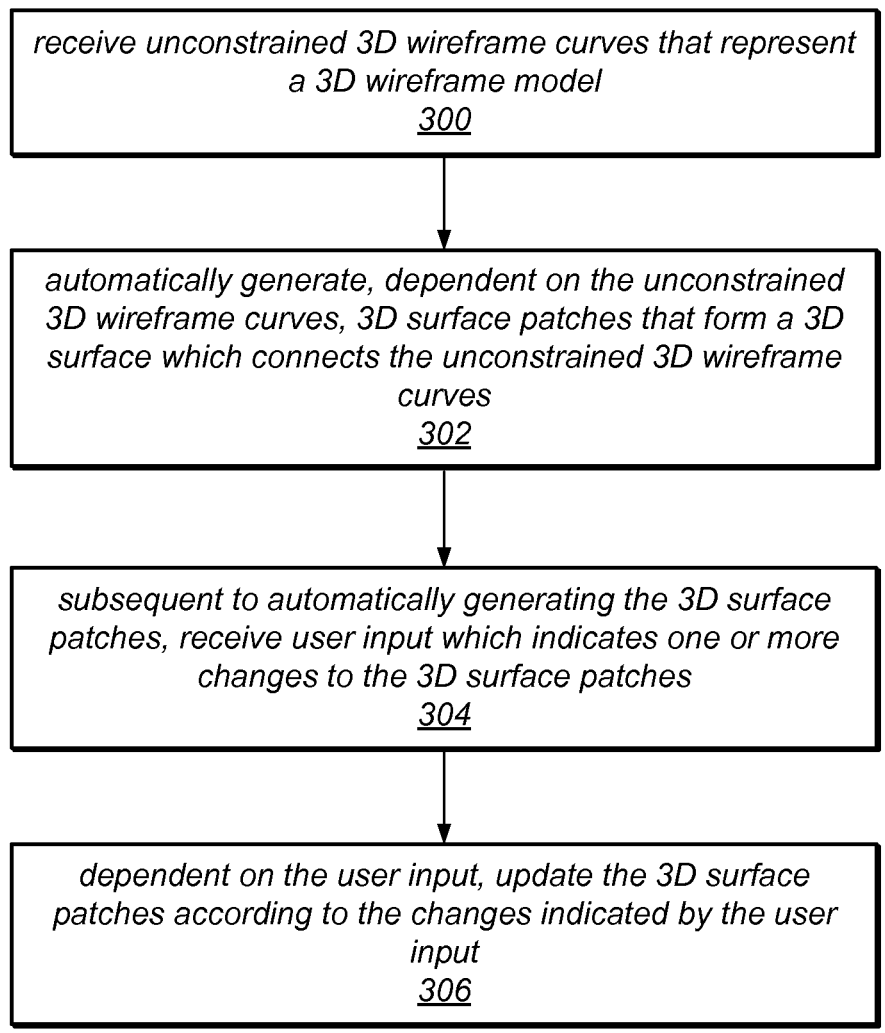
FIG. 3 illustrates an example of a method that may be used to generate 3D surface patches from unconstrained 3D wireframe curves, according to some embodiments.

FIG. 3 illustrates an example of a method that may be used to generate 3D surface patches from unconstrained 3D wireframe curves, according to some embodiments. Surface patch generator 100 may implement the method illustrated in FIG. 3 to generate a set of 3D surface patches from 3D wireframe curves 130. As indicated at 300, the method illustrated in FIG. 3 may include receiving a set of unconstrained 3D wireframe curves that represent a 3D wireframe model. For example, surface patch generator 100 may receive 3D wireframe curves 130. 3D wireframe curves 130 may not be limited to vertices and straight lines. The 3D wireframe curves may be polylines. More specifically, the 3D wireframe curves may be smooth, Bezier curves that are sampled at regular intervals and are represented by piecewise linear segments. The curve points generated by the regular interval samples may be connected by straight lines. Each piecewise linear segment may be a small portion of a particular 3D wireframe curve, therefore, the 3D wireframe curves may be smooth curves.

Figure 4A:
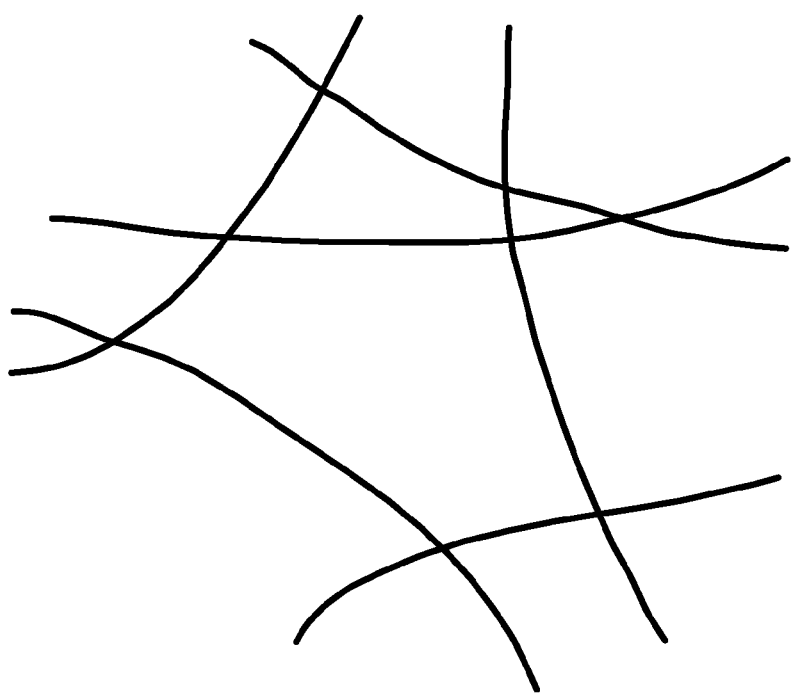
FIG. 4A illustrates an example of 3D wireframe curves for a portion of a 3D wireframe model, according to some embodiments.
Figure 4B:
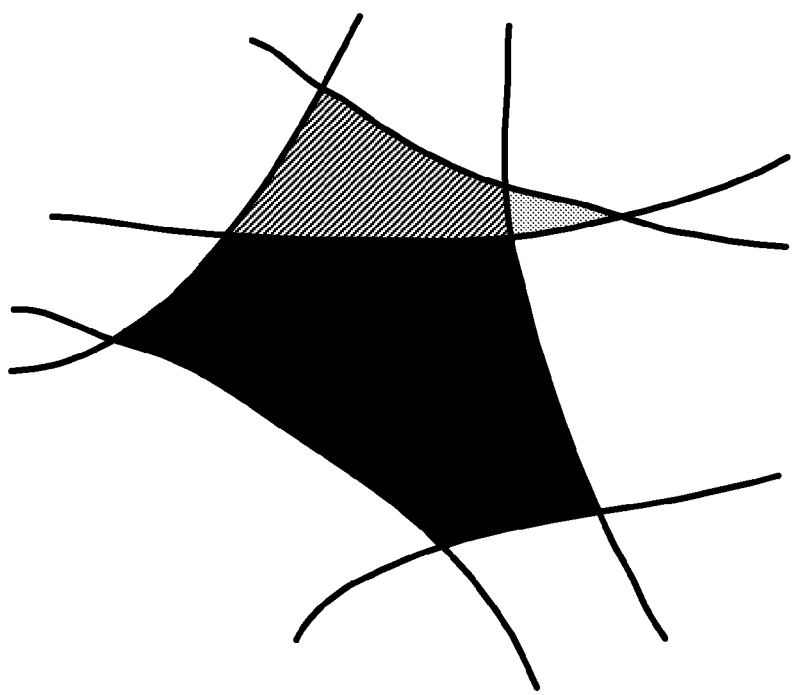
FIG. 4B illustrates an example of 3D surface patches that may be generated for the 3D wireframe model illustrated in FIG. 4A, according to some embodiments.

As indicated at 302, the method illustrated in FIG. 3 may include automatically generating, dependent on the set of 3D wireframe curves, 3D surface patches that form a 3D surface which connects the unconstrained 3D wireframe curves. As described in further detail below, in reference to FIGS. 5 and 6, surface patch generator 100 may automatically generate, dependent on 3D wireframe curves 130, a set of 3D surface patches. To automatically generate the 3D surface patches, surface patch generator 100 may locate ordered sequences of curve intersection points that may be filled in to produce a surface model. These ordered sequences of curve intersection points may form a set of closed loops, which may be referred to herein as "faces." To specify a face, face generator 112 may determine a correct sequence for subsets of the 3D wireframe curves. The identified faces may be filled in, using various embodiments of n-sided patch technologies, as described below, to generate the 3D surface patches. FIG. 4A illustrates an example of 3D wireframe curves for a portion of a 3D wireframe model. FIG. 4B illustrates an example of 3D surface patches that may be generated for the 3D wireframe model illustrated in FIG. 4A. Each differently shaded area of the example 3D wireframe model illustrated in FIG. 4B may represent a different surface patch, or a different face, that may be extracted from the 3D wireframe model illustrated in FIG. 4A.

To generate the 3D surface patches face generator 112 may automatically generate the set of faces that represent the 3D surface of the 3D wireframe model. As described in further detail below, to automatically generate the set of faces, face generator 112 may extract a set of fundamental cycles from an undirected graph which represents the connectivity of the 3D wireframe curves. Face generator 112 may reduce the set of fundamental cycles to identify a set of elementary cycles of the 3D wireframe model. An elementary cycle in the undirected graph may be a cycle, or loop, that does not intersect itself. The set of elementary cycles may be the set of faces which represent the 3D surface of the 3D wireframe model. To produce a maximum set of potential faces, face generator 112 may repeat the extraction and reduction of fundamental cycles to generate multiple sets of elementary cycles. Accordingly, face generator 112 may be able to accurately represent the 3D surface of the unconstrained 3D wireframe curves by generating as many faces for the 3D surface as possible.

As indicated at 304, the method illustrated in FIG. 3 may include, subsequent to automatically generating the 3D surface patches, receiving user input which indicates one or more changes to the 3D surface patches. As described in further detail below, surface patch adjuster 114 may receive, via user interface 110, user input 120 which may indicate changes to the automatically generated 3D surface patches. The automatically generated 3D surface patches may represent most of the 3D surface patches intended by a user for the 3D wireframe model. However, given the potentially large number of possible surface representations for a 3D wireframe model, surface patch generator 100 may not always select the 3D surface patches that were intended by the wireframe model designer. Furthermore, the automatically generated 3D surface patches may not contain the exact 3D surface that a user intended for the 3D wireframe model. As described in further detail below, surface patch adjuster 114 may provide a mechanism by which a user (e.g., the wireframe model designer) may resolve any ambiguities in the 3D surface represented by the automatically generated surface patches. For example the user may change, create, and/or delete 3D surface patches. Surface patch adjuster 114 may also enable the user to perform various management and manipulation operations on the surface patches, as described in further detail below.

As indicated at 306, the method illustrated in FIG. 3 may include, dependent on the user input, updating the 3D surface patches according to the changes indicated by the user input. Surface patch generator 100 may update the 3D surface patches according to user input 120 received via user interface 110. For example, surface patch generator 100 may change, create, and/or delete 3D surface patches as indicated by user input 120. Surface patch generator 100 may generate 3D model 140 from the updated set of 3D surface patches. 3D model 140, when rendered and displayed, may provide a visual representation of the 3D surface of the 3D wireframe model.

Automatic Surface Patch Generation

Surface patch generator 100 may work to generate, dependent on the 3D wireframe curves, the 3D surface that a wireframe model designer intended to represent with the 3D wireframe model. As described above, in regard to FIG. 2, multiple valid 3D surface representations may be possible for a single 3D wireframe model. Surface patch generator 100 may automatically generate one of the valid 3D surface representations based on an educated guess regarding the wireframe model designer's intentions. Surface patch generator may make the educated guess dependent on the 3D wireframe curves that were drawn by the wireframe model designer.

As described in further detail below, in regard to FIG. 5, to automatically generate the 3D surface that may be estimated to best represent the wireframe model designer's intentions, face generator 112 may automatically generate faces of the 3D wireframe model. A face of a 3D wireframe model may be an ordered sequence of connected curve intersection points that form a closed boundary, or loop. The face may represent a region of the 3D surface of the 3D wireframe model that is within the closed boundary. To generate a face for the 3D wireframe model, face generator 112 may identify a sequence of subsets of the 3D wireframe curves of the 3D wireframe model. Face generator 112 may order the sequence of subsets such that a consistent orientation is maintained between the face and neighboring faces on the 3D surface. Surface generator 100 may create surface patches from the generated faces using an n-sided surface patch algorithm. The surface patches may form the 3D surface that connects the set of 3D wireframe curves and represents the shape of the 3D wireframe model.

Figure 5:
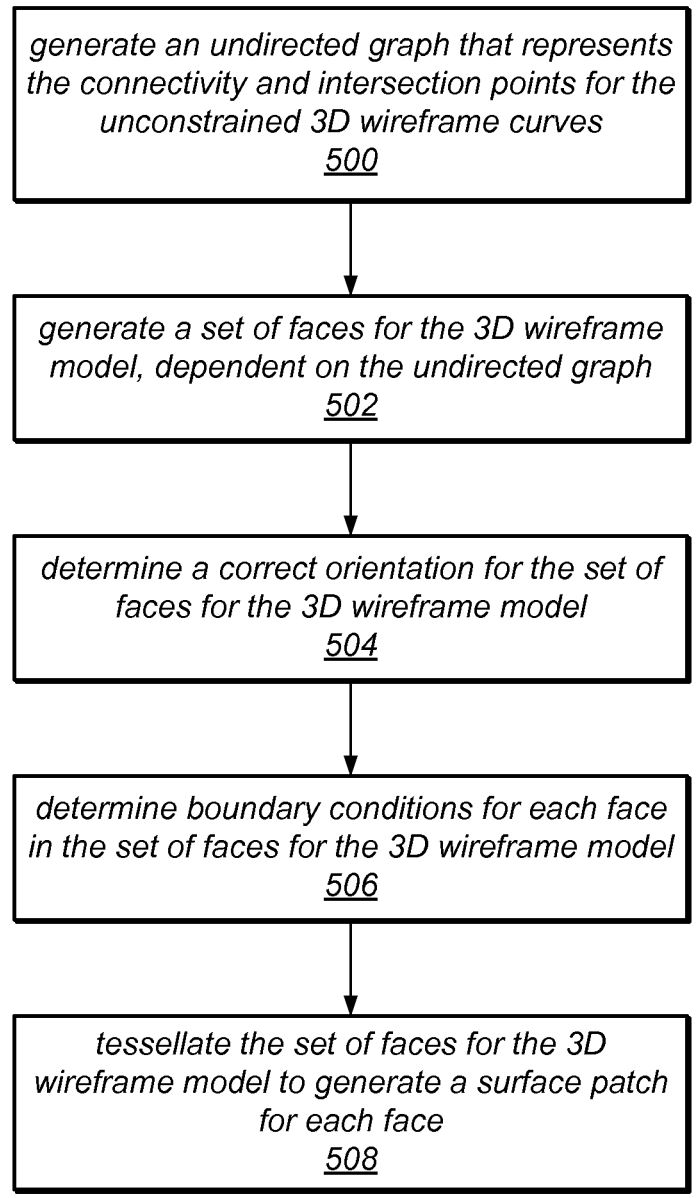
FIG. 5 illustrates an example of a method that may be used to automatically generate surface patches which may form a 3D surface that connects the set of 3D wireframe curves and represents the shape of the 3D wireframe model, according to some embodiments.

FIG. 5 illustrates an example of a method that may be used to automatically generate surface patches which may form a 3D surface that connects the set of 3D wireframe curves and represents the shape of the 3D wireframe model. As indicated at 500, the method illustrated in FIG. 5 may include generating an undirected graph that represents the connectivity of the 3D wireframe curves and represents the intersection points of the 3D wireframe curves. Face generator 112 may generate the undirected graph that may represent the connectivity and intersection points for the 3D wireframe curves. An undirected graph may be a graph in which the edges which connect vertices, or nodes, of the graph have no orientation. The edges of an undirected graph may be unordered sets, or pairs of vertices, rather than ordered pairs of vertices.

To generate the undirected graph, face generator 112 may identify all of the curve intersection points for the 3D wireframe curves. A curve intersection point may be a point at which three or more of the 3D wireframe curves intersect. Each 3D wireframe curve may be evaluated against each other 3D wireframe curve in the set of 3D wireframe curves to identify curve intersection points for the respective 3D wireframe curve. Each 3D wireframe curve may also be evaluated against itself to find points at which the 3D wireframe curve may intersect itself. Such an evaluation may identify all of the curve intersection points for a respective 3D wireframe curve.

Face generator 112 may execute $O(n^2)$ computations, where n may be the number of 3D wireframe curves, to identify all of the curve intersection points. In other embodiments, the process for identifying all of the curve intersection points may be accelerated by using alternative algorithms. For example, the 3D wireframe curves may be projected onto a two-dimensional (2D) plane. The planar map algorithm may be performed on the 2D projects of the 3D wireframe curves. The planar map algorithm may execute $O(n \log n)$ computations to identify all of the curve intersection points. Accordingly, the planar map algorithm may consume fewer computational resources (e.g., time and processor bandwidth) when identifying all of the curve intersection points for the 3D wireframe curves.

Face generator 112 may subdivide the 3D wireframe curves at the identified intersection points. For example, face generator 112 may generate 3D wireframe curve segments in which each endpoint of a curve segment is a curve intersection point. 3D wireframe curves that share a single endpoint that is not a curve intersection point may be merged into one 3D wireframe curve segment. An endpoint of a 3D wireframe curve that is not a curve intersection point may be a point that is not passed through by any other 3D wireframe curve. Accordingly, after merging such 3D wireframe curves, none of the 3D wireframe curve segments may intersect themselves. Furthermore, all of the generated 3D wireframe curve segments may intersect only at intersection points.

From the 3D wireframe curve segments, face generator 112 may generate the undirected graph. For example, each vertex, or node, of the graph may represent a curve intersection point. Each connection, or graph edge, between vertices on the undirected graph may represent a 3D wireframe curve segment. A graph edge may be represented by a set of graph vertices which indicate the connectivity between the 3D wireframe curves. Accordingly, the undirected graph may encode the connectivity of the 3D wireframe curves and may also encode the intersection points of the 3D wireframe curves.

As indicated at 502, the method illustrated in FIG. 5 may include generating a set of faces for the 3D wireframe model, dependent on the undirected graph generated at block 500 of FIG. 5. Face generator 112 may generate the faces for the 3D wireframe model by extracting elementary cycles from the undirected graph. A cycle may be a path through the undirected graph which connects multiple vertices of the undirected graph and forms a loop by starting and ending at the same vertex. An elementary cycle may be a cycle that does not pass through any vertex, other than the starting/ending vertex, more than one time. More specifically, an elementary cycle in the undirected graph may be a cycle, or loop, that does not intersect itself. An elementary cycle extracted from the undirected graph may represent a face of the 3D wireframe model.

Figure 6:
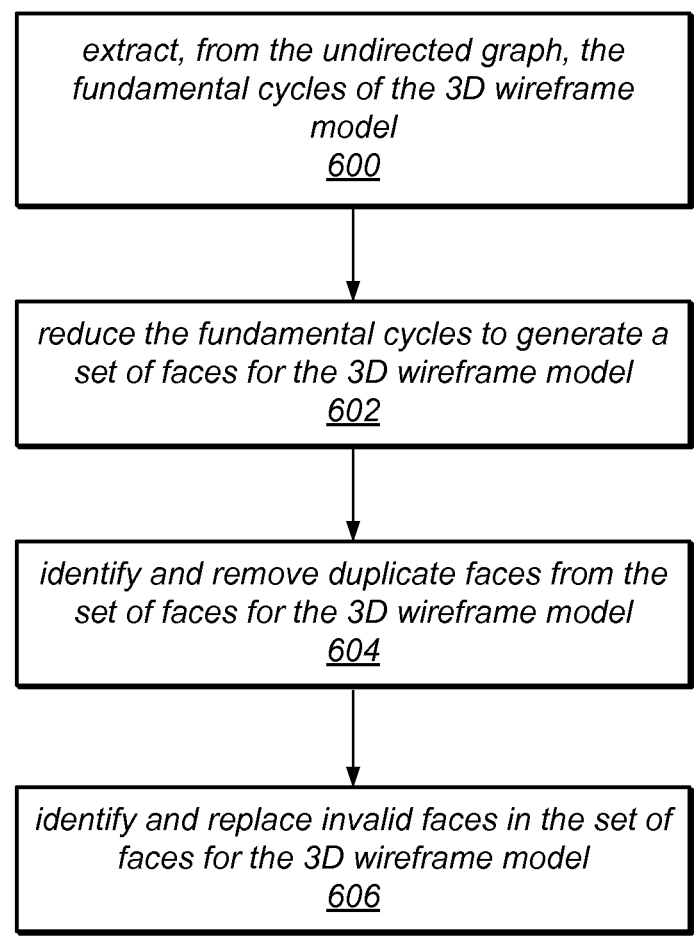
FIG. 6 illustrates a method that may be used to generate faces for the 3D wireframe model by extracting elementary cycles of the 3D wireframe model from the undirected graph, according to some embodiments.

FIG. 6 illustrates a method that may be used to generate faces for the 3D wireframe model by extracting elementary cycles of the 3D wireframe model from the undirected graph. Face generator 112 may perform the method illustrated in FIG. 6 to extract the elementary cycles from the undirected graph. As illustrated at 600, the method illustrated in FIG. 6 may include extracting, from the undirected graph, the fundamental cycles of the 3D wireframe model. The fundamental cycles of the undirected graph may form the basis for all cycles within the undirected graph. More specifically, any cycle, or loop of connected vertices, within the undirected graph may be represented by a respective combination of the fundamental cycles of the undirected graph.

Figure 7:
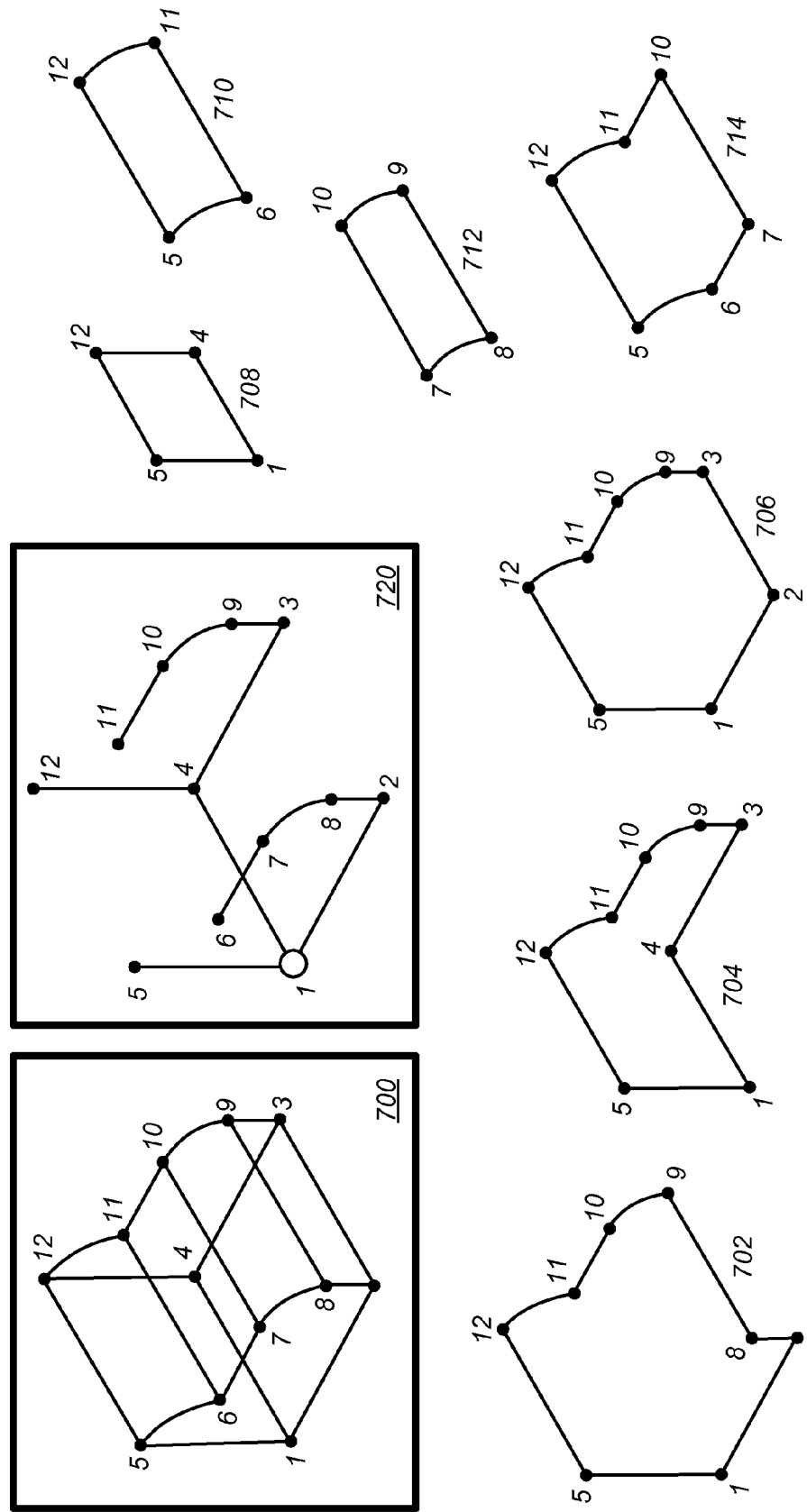
FIG. 7 illustrates examples of a 3D wireframe model, a spanning tree generated from an undirected graph that represents the 3D wireframe model, and the fundamental cycles of the 3D wireframe model, according to some embodiments.

Face generator 112 may extract fundamental cycles from the undirected graph by generating a spanning tree from the undirected graph. FIG. 7 illustrates an example of a 3D wireframe model and a spanning tree that may be generated from an undirected graph of the 3D wireframe model. Element 700 of FIG. 7 illustrates an example of a 3D wireframe model. Element 720 of FIG. 7 illustrates a spanning tree that may be generated from an undirected graph that corresponds to 3D wireframe model 700. Elements 702-714 of FIG. 7 illustrate fundamental cycles of 3D wireframe model 700.

A spanning tree that represents an undirected graph may be a tree which includes all of the vertices and at least some of the edges of the undirected graph. The edges of the undirected graph that are selected to form the spanning tree may be the edges of the undirected graph that form a tree which spans, or connects, every vertex of the undirected graph, but do not form any cycles, or loops within the spanning tree. Accordingly, a spanning tree may be a maximum set of edges of the undirected graph that do not form any cycles, or a minimum set of edges of the undirected graph that connect all vertices of the undirected graph. Note that spanning tree 720 in FIG. 7 connects all of the vertices of the 3D wireframe model, but does not form any cycles, or loops.

Face generator 112 may generate the spanning tree by performing a breadth-first search on the undirected graph. The breadth-first search may be initiated at a particular vertex of the undirected graph and may proceed through all vertices of the undirected graph to locate edges which should form the spanning tree. During the creation of the spanning tree, face generator 112 may identify undirected graph edges that, if added to the spanning tree, would form a cycle in the spanning tree. The cycle that would be formed if the identified edge was added to the spanning tree may be identified as a fundamental cycle of the 3D wireframe model. The cycles identified in this manner during the creation of the spanning tree may be the fundamental cycles of the 3D wireframe model. Elements 702-714 of FIG. 7 illustrate examples of fundamental cycles of 3D wireframe model 700 that may be identified during the generation of spanning tree 720. Note that initiating the breadth-first search from different vertices of the undirected graph may result in different set of fundamental cycles for the 3D wireframe model.

Face generator 112 may form an interaction matrix from the extracted fundamental cycles. The interaction matrix may illustrate interactions between the extracted set of fundamental cycles. More specifically, the interaction matrix may indicate how many edges each pair of fundamental cycles may have in common. Each element (i,j) in the matrix may illustrate an amount of interaction, or a number of common edges, between fundamental cycle, i, and fundamental cycle, j. As an example, a value of two for element (i,j) in the matrix may indicate that fundamental cycle i and fundamental cycle j share two common edges. As another example, a value of one for element (i,j) in the matrix may indicate that fundamental cycle i and fundamental cycle j share one common edge.

As indicated at 602, the method illustrated in FIG. 6 may include reducing the fundamental cycles to generate a set of faces for the 3D wireframe model. Face generator 112 may reduce the fundamental cycles down to elementary cycles. As described above, an elementary cycle may be a cycle, or loop, through the undirected graph that does not pass through any vertex, other than the starting/ending vertex, more than one time. The elementary cycles may correspond to the faces of the 3D wireframe model. A reduction of two fundamental cycles may remove edges and intersection points that are common to both of the fundamental cycles. The resulting, reduced cycle may be a smaller cycle. Face generator 112 may reduce the fundamental cycles in order to decrease the number of interactions between cycles. More specifically, face generator 112 may perform the fundamental cycle reduction process until the maximum interaction value between any two fundamental cycles in the interaction matrix is a value of one. At the completion of the reduction process, the same number of cycles may be present, however, the cycles may be smaller in size than the original fundamental cycles. The remaining reduced cycles may be the elementary cycles that may be the faces which represent a 3D surface of the 3D wireframe model.

Figure 8:
FIG. 8 illustrates an example of reducing two fundamental cycles to generate an elementary cycle, according to some embodiments.
Figure 8:
Figure 8:
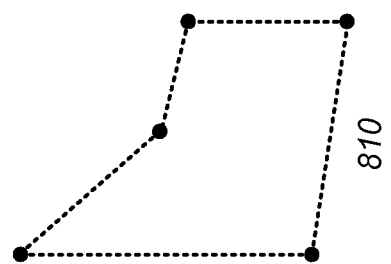
Figure 8:
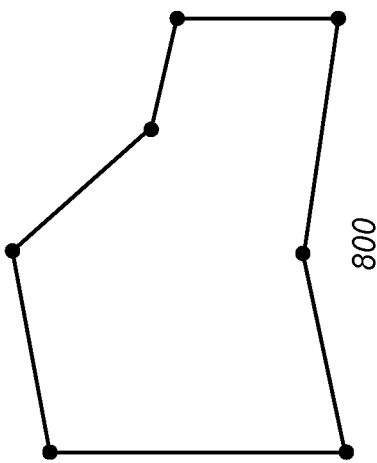

A pair of fundamental cycles may be reduced by first creating a union of the two fundamental cycles by adding the two fundamental cycles together. A reduced cycle may be generated from the union of the two fundamental cycles by removing elements (e.g., edges and intersection points) that are common to both of the fundamental cycles from the union. For example, elements may be removed via an exclusive-OR (XOR) operation, as described below. As an example, the reduction of fundamental cycle i with fundamental cycle j may be a new, reduced cycle which may include all of the edges that are in either one of fundamental cycle i or fundamental cycle j. The reduction may remove edges that are in both fundamental cycle i and fundamental cycle j such that the reduced cycle does not include edges that are in both fundamental cycle i and fundamental cycle j. FIG. 8 illustrates an example of reducing two fundamental cycles to generate an elementary cycle. As illustrated in FIG. 8, cycle 800 is reduced by cycle 810 to form cycle 820. In some embodiments, cycle 800 may be replaced with cycle 820. An exclusive-OR (XOR) function may be performed on cycles 800 and 810 to reduce the cycles into cycle 820. For example, as illustrated in FIG. 8, reduced cycle 820 may be generated by creating a union of cycle 800 and cycle 810 and removing elements (e.g., edges and intersections) that are common to both cycle 800 and cycle 810 from the union. Note that reduced cycle 820 includes all of the edges that are in either cycle 800 or cycle 810 and does not include edges that are common to both cycle 800 and cycle 810.

To reduce the set of fundamental cycles for the 3D wireframe model, face generator 112 may first identify the pair of fundamental cycles that have the highest number of common edges. A local interaction test may be performed on the identified pair of fundamental cycles to determine whether a potential reduced cycle generated from the pair may contain fewer edges than one of the fundamental cycles (e.g., an original fundamental cycle) within the pair of identified fundamental cycles. As an example, reduced cycle 820 illustrated in FIG. 8 contains fewer edges than original fundamental cycle 800. If the local interaction test indicates that the potential reduced cycle may have fewer edges than an original fundamental cycle, a reduction process may be performed on the identified pair of fundamental cycles. The original fundamental cycle (e.g., cycle 800) may then be replaced by the reduced cycle (e.g., cycle 820). Other cycles (e.g., cycle 810) of the set of fundamental cycles may remain unchanged.

If the local interaction test indicates that the potential reduced cycle may have the same number of edges as an original fundamental cycle, a global interaction test may be performed. The global interaction test may determine the interaction of the potential reduced cycle with all of the other cycles in the set of fundamental cycles. To perform the global interaction test, face generator 112 may determine a global interaction value by calculating the sum of the elements in the interaction matrix row that corresponds to the original fundamental cycle. Face generator 112 may replace the original fundamental cycle in the interaction matrix with the potential reduced cycle. Face generator 112 may then re-calculate the global interaction value by calculating the sum of the elements for the same corresponding row of the interaction matrix. The global interaction value with the potential reduced cycle present in the interaction matrix may be less than or may be equal to the global interaction matrix with the original fundamental cycle present in the interaction matrix, and the original fundamental cycle may be reduced.

Replacing the original fundamental cycle with the reduced cycle may change the cycle interactions for the set of fundamental cycles. Accordingly, the interaction matrix may be updated to reflect the cycle interactions that may be changed by replacing the original fundamental cycle with the reduced cycle. Face generator 112 may then continue the reduction process with a next pair of fundamental cycles. For example, face generator 112 may again identify the pair of cycles that have the highest number of common edges. As the reduction process proceeds, fundamental cycles that cannot be reduced may be marked to indicate that they cannot be reduced. The reduction process may continue until all of the fundamental cycles that can be reduced have been reduced and the maximum interaction value between any two cycles in the interaction maximum is a value of one. The set of reduced, fundamental cycles may be elementary cycles for the 3D wireframe model. The elementary cycles may be the set of faces which represent the 3D surface of the 3D wireframe model.

As indicated at 604, the method illustrated in FIG. 6 may include identifying and removing duplicate faces from the set of faces for the 3D wireframe model. Face generator 112 may evaluate the set of faces for the 3D wireframe model to identify faces that are duplicates. Duplicate faces may be removed from the set of faces. Face generator 112 may also identify faces which contain vertices that have direct edge connections in the undirected graph. Faces with vertices that have direct edge connections in the undirected graph may be removed from the set of faces for the 3D wireframe model. In other embodiments, face generator 112 may perform additional face removal methods to further reduce the set of faces. For example, face generator 112 may use geometric methods to remove overly non-planar or long faces from the set of 3D faces. In some embodiments, a user may specify, via options or preferences in user interface 110, criteria for removing particular types of faces from the set of faces for the 3D wireframe model.

As indicated at 606, the method illustrated in FIG. 6 may include identifying and replacing invalid faces in the set of faces for the 3D wireframe model. Conventional systems may identify and delete invalid faces from the set of faces. Such conventional systems may restrict the 3D wireframe model to a 2-manifold surface. Such a restriction may allow a conventional system to assume that each edge of a 3D wireframe model may belong to at most 2 faces. Conventional systems may remove "invalid" faces which do not adhere to this strict requirement. However, such a removal of invalid faces may prevent the conventional systems from identifying all of the faces that may be obvious to a user. Such conventional systems may always find one valid solution in situations in which the surface represented by a 3D wireframe model is ambiguous. However, the solution is dependent on the method in which the spanning tree is generated. For example, the solution is dependent on the order in which edges are searched in the spanning tree and is dependent on the vertex from which the spanning tree is initiated. Therefore, faces which appear to be invalid in one method used to generate the spanning tree may not be invalid in another method used to generate the spanning tree. More specifically, a face may appear invalid when generation of the spanning tree is initiated at one vertex. However, the face may not appear invalid when generation of the spanning tree is initiated at a different vertex. Accordingly, removing the apparently invalid faces from the set of faces, as performed in conventional methods, may remove some useful, potentially valid faces.

Surface patch generator 100 may replace invalid faces with valid faces, rather than removing the invalid faces. Replacing invalid faces with valid faces, rather than removing the invalid faces may maximize the number of potential valid faces. To replace invalid faces with valid faces, face generator 112 may identify the set of edges in the undirected graph that belong to either no faces or belong to one face. From this set of identified edges, face generator 112 may represent an unconnected graph. Face generator 112 may construct the connected components of the unconnected graph. Face generator 112 may identify the fundamental cycles that correspond to each connected component of the graph. The identified fundamental cycles may be fundamental cycles that have not yet been reduced. Conventional methods add these fundamental cycles to the existing cycle set and repeat the reduction process for the entire set of cycles. Face generator may first reduce the identified fundamental cycles of the connected graph components. Face generator 112 may then add the reduced fundamental cycles to the existing set of cycles, or faces. Reducing only the newly identified fundamental cycles may be computationally faster than conventional methods may still result in a set of faces that is comparable to conventional methods.

Face generator 112 may perform several iterations of the method illustrated in FIG. 6. Each iteration of the face generation method illustrated in FIG. 6 may begin the generation of the spanning tree from a different vertex of the undirected graph. More specifically, face generator 112 may generate the spanning tree by initiating the breadth-first search from different vertices of the undirected graph. As described above, the set of fundamental cycles that may be identified while building the spanning tree may be dependent on the vertex, of the undirected graph, from which the spanning tree generation is initiated. Accordingly, repeatedly building spanning trees by initiating the breadth-first search from different vertices of the undirected graph may produce multiple, different sets of fundamental cycles. Repeating the face generation method to generate multiple sets of fundamental cycles may enable face generator 112 to identify a maximum number of faces for the 3D wireframe model. Furthermore, repeating the face generation method may allow surface patch generator 100 to more accurately represent the unconstrained set of 3D wireframe curves by generating a larger number of faces.

Face generator 112 may independently reduce each different set of fundamental cycles. For example, face generator 112 may use a method similar to that described in reference to block 602 of FIG. 6 to independently reduce each set of fundamental cycles and generate a respective set of faces from each set of fundamental cycles. Face generator 112 may combine the multiple sets of faces to generate single set of faces. Face generator 112 may identify and remove duplicate faces from the single set of faces, for example, using a process such as that described above in reference to block 604 of FIG. 6. Face generator 112 may also identify and replace invalid faces in the single set of faces using a process similar to that described above in reference to block 606 of FIG. 6. In some embodiments, face generator 112 may generate a respective set of faces for each vertex of the undirected graph. In other embodiments, face generator 112 may generate a respective set of faces for each one of a portion of the vertices of the undirected graph. For example, face generator 112 may generate a set of faces for each one of a particular number of the vertices of the undirected graph, such as a certain percentage of the vertices.

Returning to FIG. 5, as indicated at 504, the method for automatically generating surface patches may include determining a correct orientation for the set of faces for the 3D wireframe model. Surface patch generator 100 may determine the correct orientation for the set of faces for the 3D wireframe model. The orientation of a face may be defined by the manner in which the points on the curves which define the face are ordered. The set of faces which represent the 3D surface of the 3D wireframe model should be ordered consistently such that the resulting 3D surface may have a consistent orientation (e.g., surface normal) across the entire 3D surface. Without a consistent orientation, some faces of the 3D surface may appear as holes, if backface culling is enabled for the display of the 3D model. The lack of a consistent orientation for the 3D surface may also prevent the physical realization or analysis of the 3D surface that may be constructed by combining the faces.

Surface patch generator 100 may select, at random, a face from the set of faces identified for the 3D wireframe model. Surface patch generator 100 may assign an orientation to the randomly selected face. Surface patch generator 100 may then consistently apply the same orientation assigned to the randomly selected face to all of the faces across the 3D surface represented by the faces. More specifically, surface patch generator may iteratively examine neighboring faces across the 3D surface to ensure that each face is oriented consistently with respect to its neighboring faces. Surface patch generator 100 may identify inconsistent faces that do not have an orientation that is consistent with neighboring faces. Surface patch generator may invert the orientation of each identified inconsistent face to create a consistent orientation across the entire 3D surface.

Each face may have two possible orientations. A face may form a closed loop, as described above. As an example, the orientation of the face may be in a clock-wise direction around the loop or the orientation of the face may in a counter-clockwise direction around the loop. Dependent on the selected orientation for the randomly selected face, surface patch generator 100 has a 50% probability of selecting the proper orientation for the 3D surface. A correct orientation for the 3D surface may be an orientation in which all surface normals for all of the faces of the 3D surface are pointing outward from the 3D surface. An incorrect orientation for the 3D surface may be an orientation in which all surface normals for all of the faces of the 3D surface are pointing inward towards the 3D surface.

Surface patch generator 100 may initially select an orientation for the randomly selected face which results in an incorrect orientation for the 3D surface. In such a case, surface patch generator 100 may correctly orient the 3D surface by inverting the orientation of all of the faces of the 3D surface. As an example, surface patch generator, via user interface 110, may request user feedback on the orientation of the 3D surface. If the orientation of the 3D surface is incorrect and needs to be inverted, the user may request correction of the 3D surface orientation by invoking a command via a button or keystroke in the user interface.

Note that the task of assigning a consistent orientation for the faces may only be performed for wireframe models that represent orientable, 2-manifold surfaces. Surface patch generator 100 may detect a surface that is not 2-manifold by determining whether there are more than two faces that share one edge (e.g., curve in the 3D wireframe model). Surface patch generator 100 may detect a surface is not orientable by determining whether the face orientation method described above creates neighboring faces with inconsistent orientation. Upon discovering a surface that is not a 2-manifold surface or a surface that is not orientable, surface patch generator 100 may abort the automatic face orientation process described above. In such a case, surface patch generator may request that a user, via user interface 110, complete the task of assigning an orientation (a binary selection, as described above) to each face.

As indicated at 506, the method illustrated in FIG. 5 may include determining boundary conditions for each face in the set of faces for the 3D wireframe model. Surface patch generator 100 may determine the boundary conditions for points along the curves that form face boundaries. The boundary conditions for a point may include the position of the point on the 3D surface and the position derivative (e.g. the surface normal) of the point. The position of a point on the 3D surface is defined by the curve on which the point lies. Surface patch generator 100 may calculate the position derivative for each point. To calculate the position derivative (e.g., surface normal) for a point, surface patch generator 100 may first calculate the surface normals at the curve intersection points. Surface patch generator 100 may assume that the curve intersection points fall on smooth boundaries. Note that this assumption may be dependent on a user-configurable option in user interface 110.

Surface patch generator 100 may calculate the surface normals at curve intersection points based on this smooth boundary assumption. To calculate a surface normal at a curve intersection point, surface patch generator 100 may calculate the average of the normalized cross products that are subtended, by consecutive pairs of emanating surface edges, at the curve intersection point. As an example, this calculation for a surface normal at a curve intersection point may be similar to determining the surface normal at a mesh vertex. For example, the surface normal at the mesh vertex may be determined by calculating an average of the normals of the faces that are adjacent to the mesh vertex.

Surface patch generator 100 may interpolate the calculated surface normals for two curve intersection points along the curve that connects the two curve intersection points. Surface patch generator 100 may linearly interpolate the surface normals to smoothly blend the surface normal from one endpoint of the curve to the other. Accordingly, surface normals (e.g., position derivatives) for all points along the curve may be defined by the linear interpolation. Using this method, surface patch generator 100 may calculate a position derivative for each point along the curves that form face boundaries. The point position (defined by the curve on which the point lies) and the point derivative (the surface normal interpolated from surface normals at curve intersection points) may represent the boundary conditions for a point on a curve which forms a boundary of a face on the 3D surface. In some embodiments, the boundary conditions for a point on a curve may be G1 (e.g., geometry up to the $1^{st}$ order) boundary constraints.

As indicated at 508, the method illustrated in FIG. 5 may include tessellating the set of faces for the 3D wireframe model to generate a surface patch for each face. Surface patch generator 100 may tessellate the faces, dependent on the boundary conditions determined at block 506 of FIG. 5, using any one of a variety of n-sided patch representation algorithms. For example, in one embodiment, surface patch generator 100 may use the n-sided Repoussé algorithm, such as described in U.S. application Ser. No. 12/276,106 entitled "Method and Apparatus for Surface Inflation Using Surface Normal Constraints" filed Nov. 21, 2008, the content of which is incorporated by reference herein in its entirety. In other embodiments, surface patch generator 100 may use other n-sided surface representations may be used. For example, surface patch generator 100 may use subdivision surfaces, a developable surface determined from the curved boundaries, or other n-sided patch technologies.

Manual Surface Patch Adjustment

As described above the above surface patch generator 100 may find most of the 3D surface patches which represent the 3D surface intended by a wireframe model designer. However, surface patch generator 100 may not find all of the 3D surface patches that can be formed from the 3D wireframe model. Furthermore, the automatically generated 3D surface patches may not represent the exact 3D surface that the wireframe model designer intended for the 3D wireframe model. Furthermore, the automatically generated 3D surface patches may represent a 3D model that may be more dense (e.g. too many surface patches) more sparse (e.g., not enough surface patches) than desired by a user. Accordingly, surface patch adjuster 114 may provide a mechanism by which a user may manually adjust the automatically generated set of 3D surface patches. For example, the mechanism may be user interface 110 which may enable a user to interactively change, create, and/or delete surface patches and perform other surface patch management operations.

A 3D wireframe model (and its subsequent decomposition into 3D surface patches) may be a form of boundary representation for a 3D surface. As a result, surface patch adjuster 114 may enable several user workflows that may be implemented for other types of surface boundary representations.

For example, surface patch adjuster 114 may enable user workflows for merging surface patches, splitting surface patches, and building a hierarchy of surface patches (which may include propagating changes from parent surface patches to respective child surface patches).

Surface patch adjuster 114 may enable, via user interface 110, various specific mechanisms which a user may apply to a set of 3D surface patches that may be generated automatically by the system. For example, surface patch adjuster 114 may provide a mechanism for surface patch simplification (which may reduce the total number of surface patches, particularly in regions with an unnecessarily large number of small surface patches). As another example, surface patch adjuster 114 may provide a mechanism for a user to add surface patches in selected regions. As yet another example, surface patch adjuster 114 may provide a mechanism for a user to create surface patches by selecting curves and/or intersection points which correspond to surface patches. Surface patch adjuster 114 may provide such mechanisms via the surface patch operations described in detail below. Note that other embodiments of surface patch adjuster 114 may provide additional mechanisms by which a user may manipulate surface patches.

Merging Surface Patches

Surface patch adjuster 114 may merge two or more surface patches into a single surface patch by eliminating the curves that may be shared by the boundaries of the two or more surface patches. The surface patches to be merged may be adjacent to each other. The surface patches may be selected interactively by a user via a selection mechanism provided by user interface 110. In other embodiments, surface patches that are potential candidates of the merging process may be automatically selected by surface patch adjuster 114. For example, a user may indicate, via a command button, for example, in user interface 110, that appropriate surface patches should automatically be merged by surface patch adjuster 114. Surface patches that are candidates for the patch merge process may be automatically identified by analyzing the dihedral angle across the common edge shared by two surface patches. The dihedral angle may be the angle between the surface normals of the surface patches on either side of the common edge. A small dihedral angle may indicate geometric continuity across the common edge. Geometric continuity may imply that the common edge may be removed to merge the surface patches.

Splitting Surface Patches

Surface patch adjuster 114 may split a large surface patch into smaller surface patches to introduce geometric discontinuity into the 3D surface or to add more detail to the 3D surface. Surface patch adjuster 114 may split a surface patch by adding a central point to the surface patch. Surface patch adjuster 114 may then connect the central point of the surface patch to the halfway point of all the boundary curves of the surface patch. The curves between the central point of the surface patch and the boundary curves of the surface patch may initially be straight curves. The straight curves may be projected to the closest points on the surface patch. In other embodiments, a user may draw, via user interface 110, a splitting curve on the surface patch. The user-indicated splitting curve may be used to separate the surface patch into two separate, distinct surface patches. In other embodiments, surface patch splitting may be performed automatically by segmenting a surface patch into geometrically disjoint regions. For example, surface patch adjuster 114 may segment a surface patch by grouping similar surface patch regions dependent on the surface normals for the surface patch regions.

Surface Patch Hierarchy

A merged surface patch, which may be created by merging two or more surface patches, may be considered a parent of the smaller, child surface patches that were used to create the merged surface patch. Merged surface patches may be further merged into larger grand-parent surface patches, and so on. Similarly, a surface patch that may be split into two or more surface patches may be considered a parent of the smaller patches which result from splitting the surface patch. The surface patch merge and surface patch split operations may enable a user to create a hierarchy of surface patches. Such a hierarchy of surface patches may be useful for creating a coarse to fine level of detailed surface representation for the 3D surface. Surface patch adjuster 114 may define explicit rules for merging and splitting surface patches. For example, surface patch adjuster 114 may allow surface patches to be merged only if the surface patches do not already have parent surface patches. In other embodiments, surface patch adjuster 114 may request that the user discard existing parent surface patches for a set of surface patches before merging the set of surface patches to create a new parent surface patch.

Predictive Interface for Generating Surface Patches

An expert user may want to select curve intersection points (or the curves between curve intersection points) to create a new surface patch. Interactively selecting points and curves may be time-consuming for a user. Surface patch adjuster 114 may speed up the process of generating new surface patches by attempting to guess which surface patches the user may to create. For example, surface patch adjuster 114 may identify curve intersection points previously selected by the user and surface patches previously generated by the user. Using the previously selected curve intersection points and the previously generated surface patches, surface patch adjuster may generate a new surface patch for the user. Since there may be multiple options for completing the surface patch, surface patch adjuster 114 may rank the possible options. The ranking algorithm that may be used by surface patch adjuster 114 may assign a higher ranking (e.g., higher priority) to surface patches that have smaller perimeters in graph space. The top ranked surface patches may be presented to the user as suggested new surface patches. The ranked list of surface patches may be updated as the user selects additional curve intersection points or curves. When a surface patch that the user desires is presented as a suggested new surface patch, the user may immediately generate the new surface patch by selecting the presented surface patch.

Example System

Figure 9:
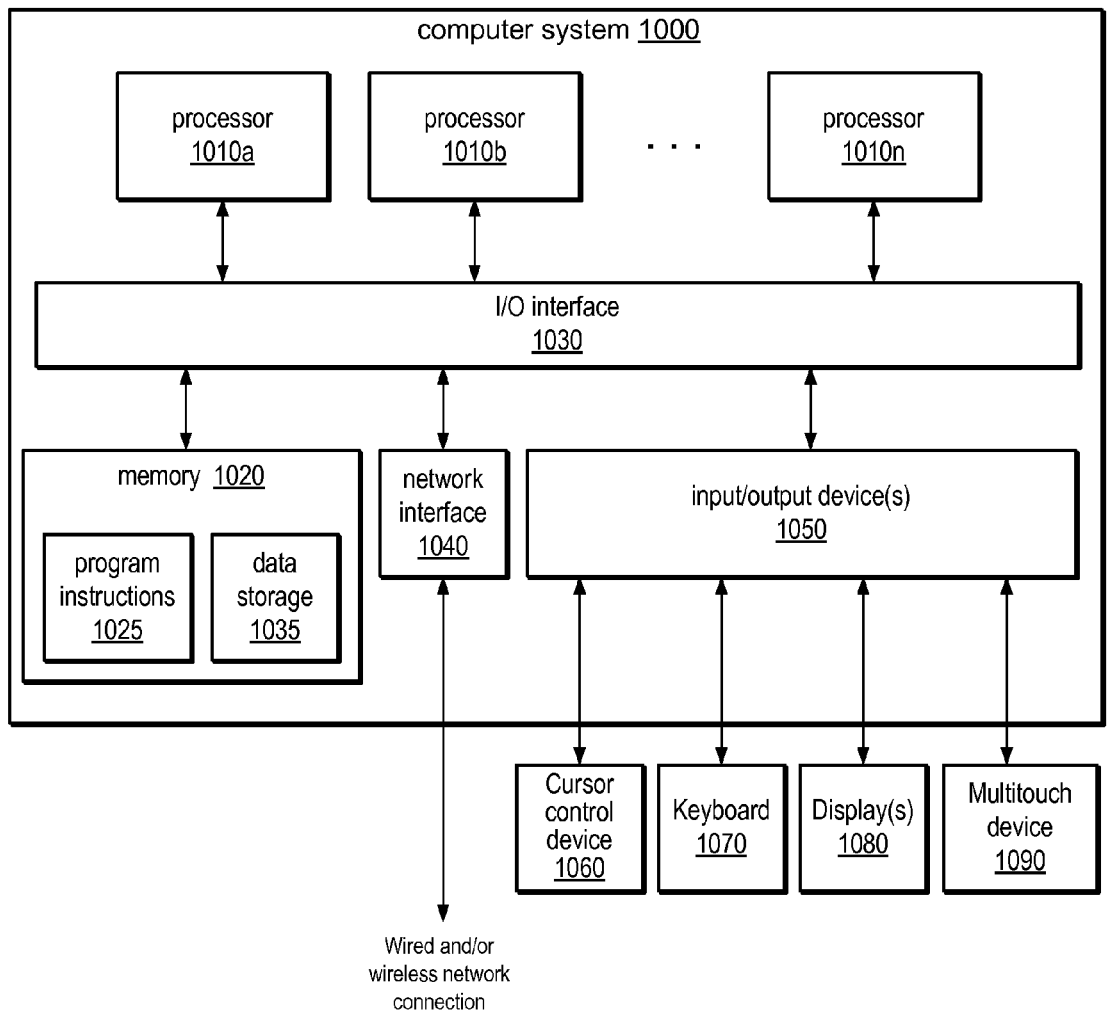
FIG. 9 illustrates an example computer system that may be used in embodiments.

Various components of embodiments of methods as illustrated and described in the accompanying description may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (for example, two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   receiving a plurality of unconstrained three-dimensional (3D) wireframe curves which represent a 3D wireframe model; and
   automatically generating, dependent on the plurality of unconstrained 3D wireframe curves, a plurality of 3D surface patches that form a 3D surface which connects the plurality of unconstrained 3D wireframe curves, wherein the 3D surface represents a 3D shape of the 3D wireframe model, wherein said automatically generating the plurality of 3D surface patches comprises generating an undirected graph representing a connectivity for the plurality of unconstrained 3D wireframe curves and representing a plurality of intersection points for the plurality of unconstrained 3D wireframe curves.

2. The method of claim 1, wherein the plurality of unconstrained 3D wireframe curves are organized in an arbitrary order, wherein the plurality of 20 unconstrained 3D wireframe curves comprise at least two 3D wireframe curves with inconsistent orientations, and wherein the plurality of unconstrained 3D wireframe curves comprise an arbitrary number and type of intersections between the plurality of 3D wireframe curves.

3. The method of claim 1, wherein each one of the plurality of unconstrained 3D wireframe curves intersects with other ones of the plurality of unconstrained 3D wireframe curves at a finite number of points and wherein each one of the plurality of unconstrained 3D wireframe curves comprises well-defined tangents for all points along the respective unconstrained 3D wireframe curve.

4. The method of claim 1, wherein said automatically generating the plurality of 3D surface patches comprises:
   generating, dependent on the undirected graph, a plurality of faces for the 3D wireframe model;
   determining a correct orientation for the plurality of faces;
   determining boundary conditions for the plurality of faces; and
   tessellating the plurality of faces to generate the plurality of 3D surface patches.

5. The method of claim 4, wherein said generating the plurality of faces for the 3D wireframe model comprises:
   extracting, from the undirected graph, a plurality of fundamental cycles for the 3D wireframe model;
   reducing the plurality of fundamental cycles to generate a plurality of reduced fundamental cycles for the 3D wireframe model, wherein the plurality of elementary cycles represent the plurality of faces for the 3D wireframe model;
   identifying and removing duplicate faces from the plurality of faces for the 3D wireframe model; and
   identifying and replacing invalid faces m the plurality of faces for the 3D wireframe model.

6. The method of claim 5,
   wherein said extracting the plurality of fundamental cycles for the 3D wireframe model comprises generating a spanning tree for the undirected graph, wherein said generating the spanning tree comprises performing a search that originates from a vertex of the undirected graph; and further comprising repeating said extracting, said reducing, said identifying and removing duplicate faces, and said identifying and replacing invalid faces for each vertex of the undirected graph.

7. The method of claim 1, further comprising:

subsequent to said automatically generating the plurality of 3D surface patches, receiving user input which indicates one or more changes to the plurality of 3D surface patches; and updating, dependent on the user input, the plurality of 3D surface patches according to the one or more changes indicated by the user input.

8. A non-transitory computer-readable storage medium storing program instructions executable on a computer to implement a surface patch generator that during operation:

receives a plurality of unconstrained three-dimensional (3D) wireframe curves which represent a 3D wireframe model; and automatically generates, dependent on the plurality of unconstrained 3D wireframe curves, a plurality of 3D surface patches that form a 3D surface which connects the plurality of unconstrained 3D wireframe curves, wherein the 3D surface represents a 3D shape of the 3D wireframe model, wherein said automatically generating the plurality of 3D surface patches comprises generating an undirected graph representing a connectivity for the plurality of unconstrained 3D wireframe curves and representing a plurality of intersection points for the plurality of unconstrained 3D wireframe curves.

9. The non-transitory medium of claim 8, wherein the plurality of unconstrained 3D wireframe curves are organized in an arbitrary order, wherein the plurality of unconstrained 3D wireframe curves comprise at least two 3D wireframe curves with inconsistent orientations, and wherein the plurality of unconstrained 3D wireframe curves comprise an arbitrary number and type of intersections between the plurality of 3D wireframe curves.

10. The non-transitory medium of claim 8, wherein each one of the plurality of unconstrained 3D wireframe curves intersects with other ones of the plurality of unconstrained 3D wireframe curves at a finite number of points and wherein each one of the plurality of unconstrained 3D wireframe curves comprises well-defined tangents for all points along the respective unconstrained 3D wireframe curve.

11. The non-transitory medium of claim 8, wherein to automatically generate the plurality of 3D surface patches, the surface patch generator is further operable to:

generate, dependent on the undirected graph, a plurality of faces for the 3D wireframe model;

determine a correct orientation for the plurality of faces;

determine boundary conditions for the plurality of faces; and tessellate the plurality of faces to generate the plurality of 3D surface patches.

12. The non-transitory medium of claim 11, wherein to generate the plurality of faces for the 3D wireframe model, the surface patch generator is further operable to:

extract, from the undirected graph, a plurality of fundamental cycles for the 3D wireframe model;

reduce the plurality of fundamental cycles to generate a plurality of elementary cycles for the 3D wireframe model, wherein the plurality of elementary cycles represent the plurality of faces for the 3D wireframe model;

identify and remove duplicate faces from the plurality of faces for the 3D wireframe model; and identify and replace invalid faces in the plurality of faces for the 3D wireframe model.

13. The non-transitory medium of claim 12, wherein said extracting the plurality of fundamental cycles for the 3D wireframe model comprises generating a spanning tree for the undirected graph, wherein said generating the spanning tree comprises performing a search that originates from a vertex of the undirected graph; and further comprising repeating said extracting, said reducing, said identifying and removing duplicate faces, and said identifying and replacing invalid faces for each vertex of the undirected graph.

14. The non-transitory medium of claim 8, the surface patch generator is further operable to:

subsequent to the automatic generation of the plurality of 3D surface patches, receive user input which indicates one or more changes to the plurality of 3D surface patches; and update, dependent on the user input, the plurality of 3D surface patches according to the one or more changes indicated by the user input.

15. A system, comprising:

a memory; and one or more processors coupled to the memory, wherein the memory stores program instructions executable by the one or more processors to implement a surface patch generator that during operation:

receives a plurality of unconstrained three-dimensional (3D) wireframe curves which represent a 3D wireframe model;

automatically generates, dependent on the plurality of unconstrained 3D wireframe curves, a plurality of 3D surface patches that form a 3D surface which connects the plurality of unconstrained 3D wireframe curves, wherein the 3D surface represents a 3D shape of the 3D wireframe model;

subsequent to the automatic generation of the plurality of 3D surface patches, receives user input which indicates one or more changes to the plurality of 3D surface patches; and updates, dependent on the user input, the plurality of 3D surface patches according to the one or more changes indicated by the user input.

16. The system of claim 15, wherein the plurality of unconstrained 3D wireframe curves are organized in an arbitrary order, wherein the plurality of unconstrained 3D wireframe curves comprise at least two 3D wireframe curves with inconsistent orientations, and wherein the plurality of unconstrained 3D wireframe curves comprise an arbitrary number and type of intersections between the plurality of 3D wireframe curves.

17. The system of claim 15, wherein each one of the plurality of unconstrained 3D wireframe curves intersects with other ones of the plurality of unconstrained 3D wireframe curves at a finite number of points and wherein each one of the plurality of unconstrained 3D wireframe curves comprises well-defined tangents for all points along the respective unconstrained 3D wireframe curve.

18. The system of claim 15, wherein to automatically generate the plurality of 3D surface patches, the surface patch generator is further operable to:

generate an undirected graph, wherein the undirected graph represents a connectivity for the plurality of unconstrained 3D wireframe curves, and wherein the undirected graph represents a plurality of intersection points for the plurality of unconstrained 3D wireframe curves;

generate, dependent on the undirected graph, a plurality of faces for the 3D wireframe model;

determine a correct orientation for the plurality of faces;

determine boundary conditions for the plurality of faces; and tessellate the plurality of faces to generate the plurality of 3D surface patches.

19. The system of claim 18, wherein to generate the plurality of faces for the 3D wireframe model, the surface patch generator is further operable to:

extract, from the undirected graph, a plurality of fundamental cycles for the 3D wireframe model;

reduce the plurality of fundamental cycles to generate a plurality of elementary cycles for the 3D wireframe model, wherein the plurality of elementary cycles represent the plurality of faces for the 3D wireframe model;

identify and remove duplicate faces from the plurality of faces for the 3D wireframe model; and identify and replace invalid faces in the plurality of faces for the 3D wireframe model.

20. The system of claim 19, wherein said extracting the plurality of fundamental cycles for the 3D wireframe model comprises generating a spanning tree for the undirected graph, wherein said generating the spanning tree comprises performing a search that originates from a vertex of the undirected graph; and further comprising repeating said extracting, said reducing, said identifying and removing duplicate faces, and said identifying and replacing invalid faces for each vertex of the undirected graph.

* * * * *